(12) United States Patent
Kedwards

(10) Patent No.: US 11,066,053 B2
(45) Date of Patent: Jul. 20, 2021

(54) BRAKE PEDAL WEIGHT DEVICE AND RELATED METHODS

(71) Applicant: Jason Kedwards, Clovis, CA (US)

(72) Inventor: Jason Kedwards, Fresno, CA (US)

( * ) Notice: Subject to any disclaimer, the term of this patent is extended or adjusted under 35 U.S.C. 154(b) by 40 days.

(21) Appl. No.: 16/374,417

(22) Filed: Apr. 3, 2019

(65) Prior Publication Data
US 2020/0317169 A1    Oct. 8, 2020

(51) Int. Cl.
*B60T 7/12*    (2006.01)
*B60R 25/00*    (2013.01)
*B60T 8/40*    (2006.01)

(52) U.S. Cl.
CPC .............. *B60T 7/12* (2013.01); *B60R 25/005* (2013.01); *B60T 8/4072* (2013.01)

(58) Field of Classification Search
CPC ........ B60T 17/18; B60T 17/22; B60T 17/221; B60T 7/12; B60R 25/005; B60R 25/08; B60R 25/083; G05G 5/06; G05G 2700/108; G01L 5/28
USPC .................................... 188/265; 73/121, 132
See application file for complete search history.

(56) References Cited

U.S. PATENT DOCUMENTS

| 1,877,367 A | 10/1928 | Seppmann |
| 1,721,227 A * | 7/1929 | Manley .................... G05G 5/06 254/100 |
| 2,662,728 A | 5/1951 | Hanes et al. |
| 2,820,626 A | 3/1956 | Hedeen |
| 2,882,084 A * | 4/1959 | Eatinger ................ A01K 97/14 294/26 |
| 2,964,965 A * | 12/1960 | Hanson .................. B60K 23/00 74/481 |
| 3,125,898 A * | 3/1964 | Maples ................. B60T 17/223 74/532 |
| 5,181,404 A | 1/1993 | Baker |

(Continued)

FOREIGN PATENT DOCUMENTS

GB        2248673 A    4/1992

OTHER PUBLICATIONS

Truck Pedal Depressor—Item No. 21520, and Accelerator Pedal Depressor, both obtained Feb. 21, 2019.

(Continued)

*Primary Examiner* — Thomas J Williams
(74) *Attorney, Agent, or Firm* — Sierra IP Law, PC; Mark D. Miller

(57) ABSTRACT

The present invention provides methods and apparatus for engaging the brake pedal of a vehicle using only the weight of the device, allowing a single person to check for proper functioning of the vehicle's brake lights without having to further attach the device to a seat or steering wheel of the vehicle, and methods of using the same. The device may include an elongated arm or lever, an attachment member at one end of the arm for engaging it with the brake pedal, and a weighted member at the opposite end of the arm for providing downward force against the brake pedal. The attachment member may comprise a bracket with one or more widths, allowing the device to securely engage with brake pedals of varying sizes and thicknesses, such that the same bracket may be used to engage a relatively small and thin brake pedal of a car, or a larger, thicker brake pedal of a commercial vehicle such as a bus or a semi-truck.

18 Claims, 14 Drawing Sheets

(56) References Cited

U.S. PATENT DOCUMENTS

| | | | | |
|---|---|---|---|---|
| D341,297 S | * | 11/1993 | Martner | D7/368 |
| 5,345,796 A | * | 9/1994 | Chieh | B60R 25/005 70/202 |
| 5,379,619 A | * | 1/1995 | Young | B60R 25/005 70/199 |
| 5,583,288 A | | 12/1996 | Brenner et al. | |
| 5,765,416 A | | 6/1998 | Cote | |
| 5,839,326 A | | 11/1998 | Song | |
| 5,848,584 A | * | 12/1998 | Brog | A47J 33/00 126/30 |
| 5,954,164 A | * | 9/1999 | Latham | B60T 17/223 188/112 R |
| 6,000,739 A | * | 12/1999 | Zemit | A47J 45/10 126/25 R |
| 6,044,671 A | * | 4/2000 | Haire | B60T 17/223 188/352 |
| 6,131,712 A | * | 10/2000 | Rhodenizer | B60T 17/223 188/3 H |
| 6,792,780 B1 | | 9/2004 | De Lucia | |
| 7,134,548 B2 | | 11/2006 | Meehan et al. | |
| 7,412,859 B2 | * | 8/2008 | Lycoudis | B60R 25/005 70/202 |
| 8,662,262 B1 | | 3/2014 | Decker, Jr. | |

OTHER PUBLICATIONS

Rugged 16-Oz Rubber Mallet Product description retrieved on Apr. 3, 2019 from "http://www.coleman.com/rugged-16-oz-rubber-mallet/ 2000025211.html".

Lisle Truck Pedal Depressor—LIS21520 Product description retrieved on Apr. 3, 2019 from "https://www.ryderfleetproducts.com/lisle-lis21520/truck-pedal-depressor-p-tol-lis21520".

* cited by examiner

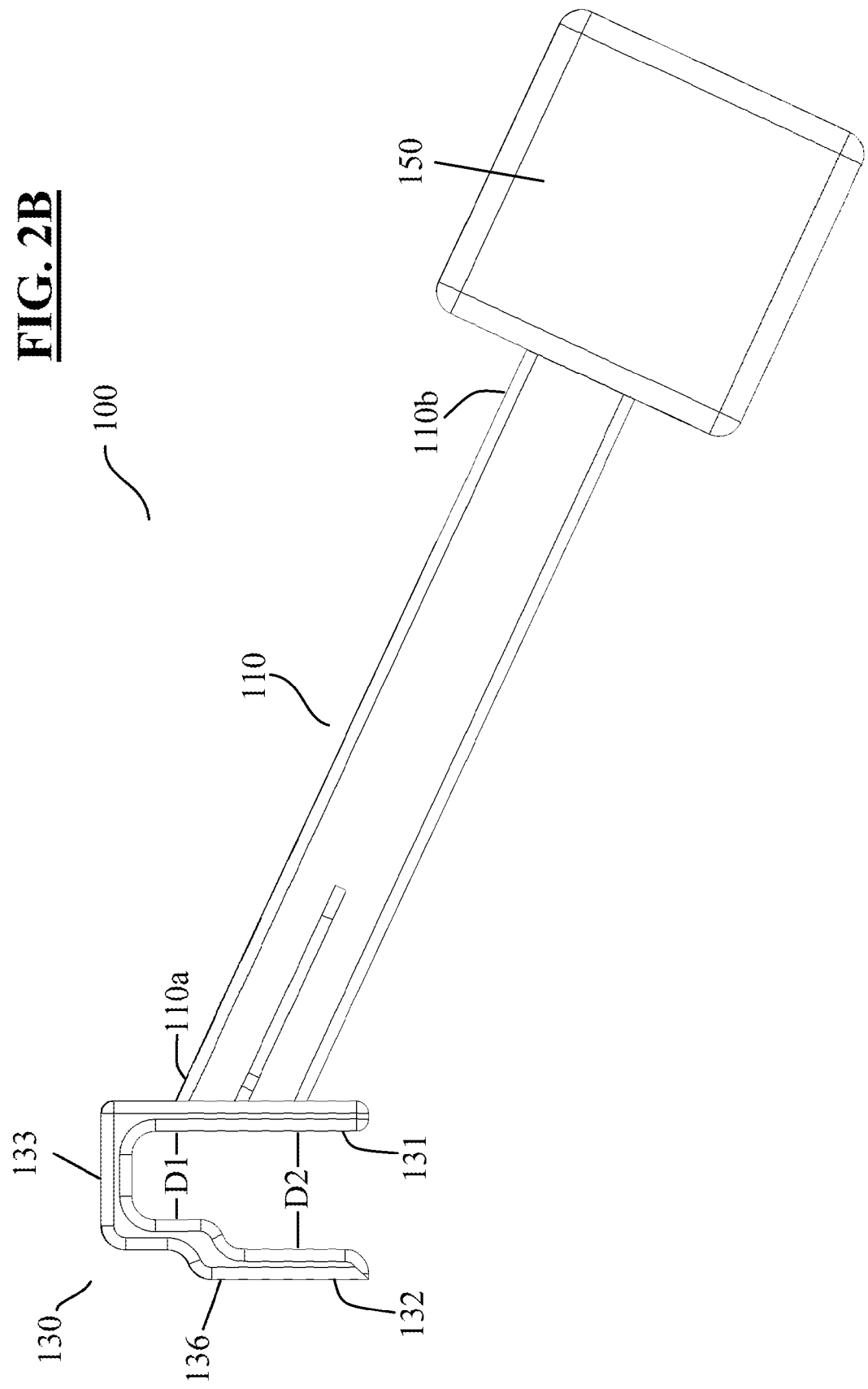

FIG. 2E
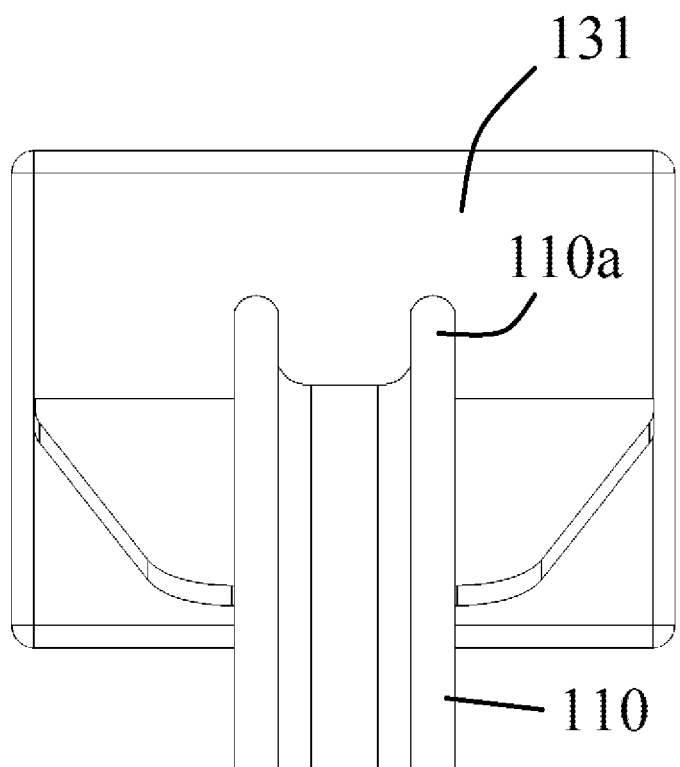
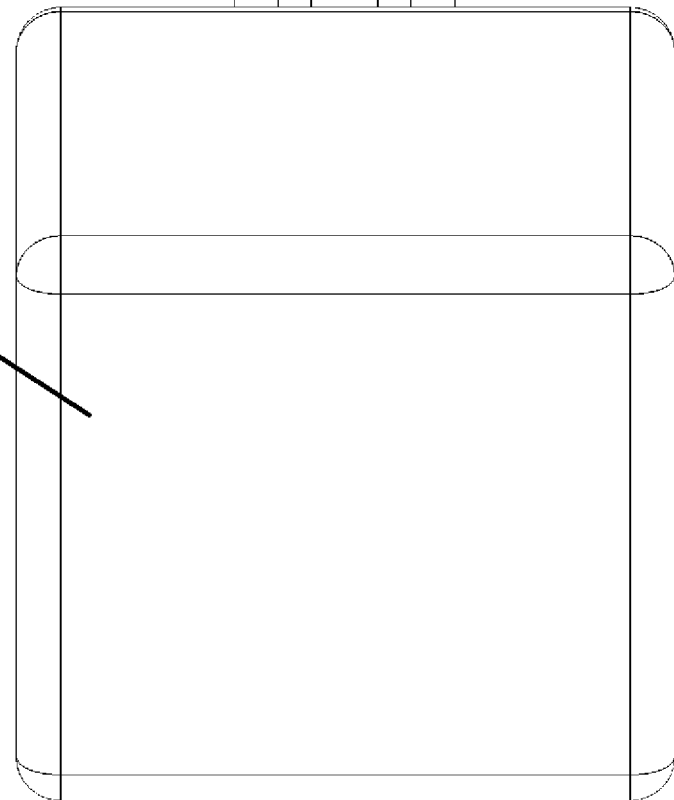

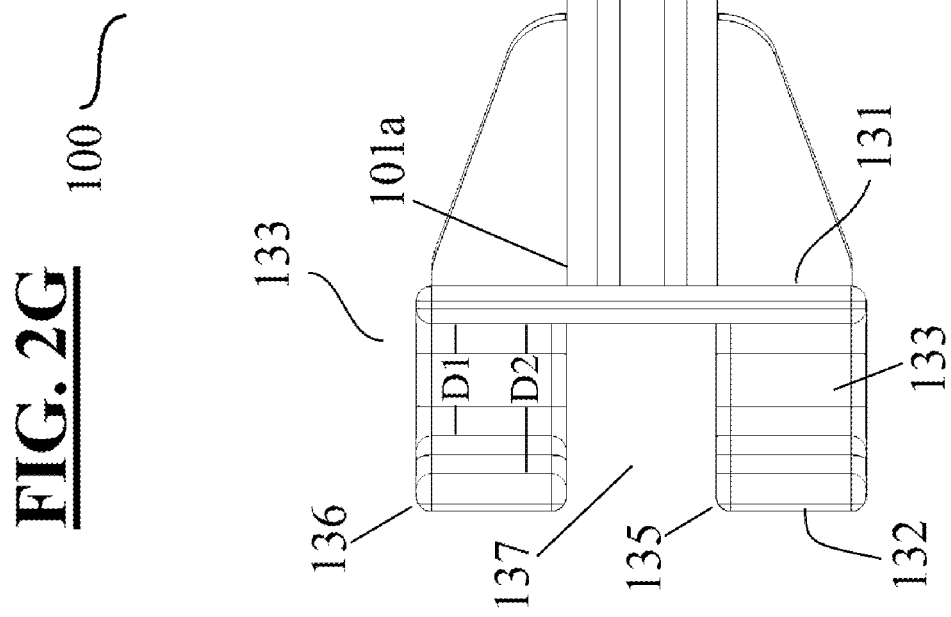

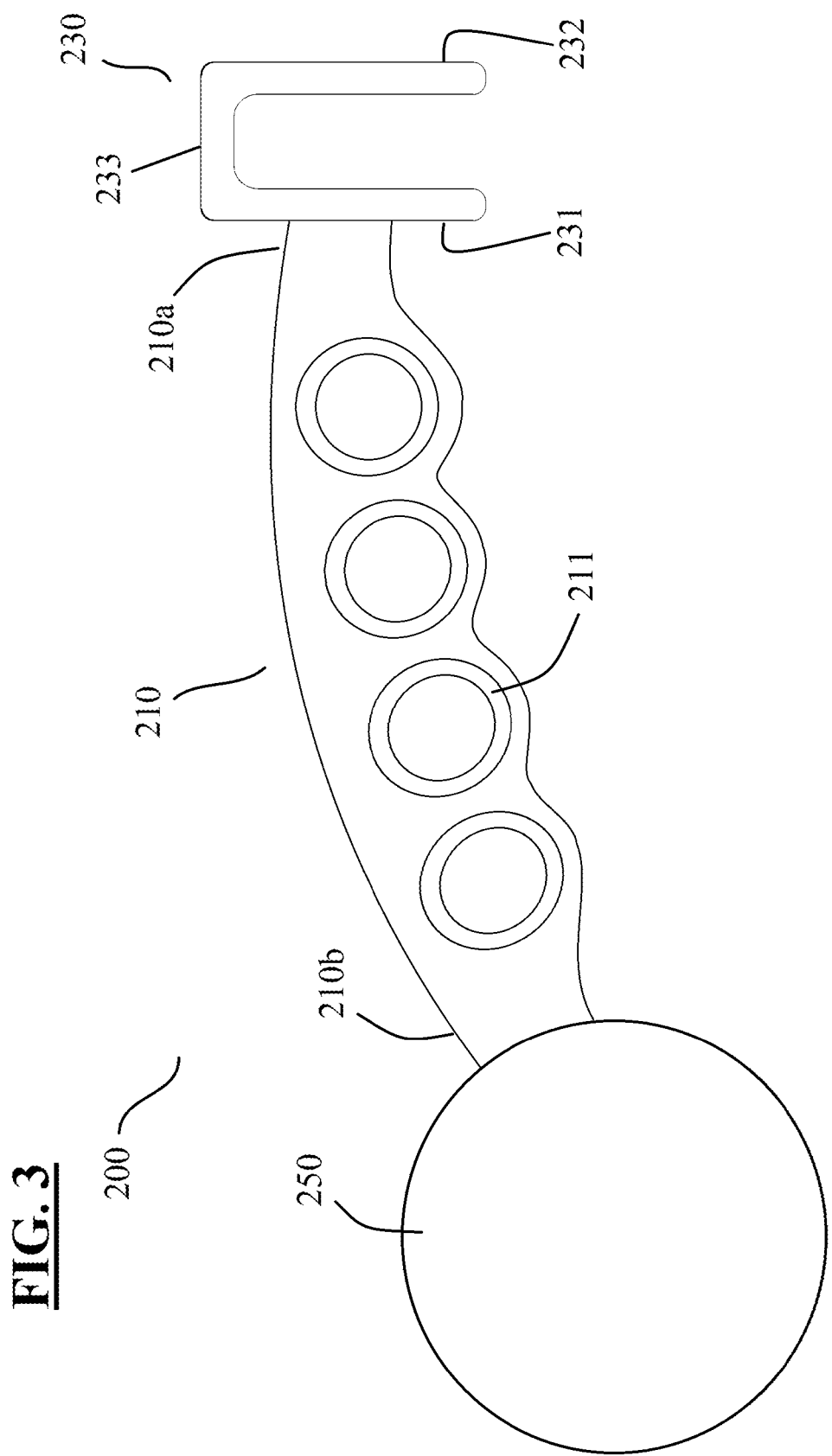

BRAKE PEDAL WEIGHT DEVICE AND RELATED METHODS

FIELD OF THE INVENTION

The present invention relates generally to vehicle brake lights and brake pedals, and more particularly to a device for engaging a vehicle brake pedal to activate the exterior brake lights of the vehicle using only the weight of the device in order to allow a user to check the function of the brake lights, and methods for using the same.

BACKGROUND OF THE INVENTION

Many commercial vehicles, such as school buses and commercial tractor-trailers (e.g., semi-trucks), are subject to rules and regulations that require periodic (e.g., daily) inspection of various aspects of the vehicle, including the functionality of the vehicle's brake lights. Both commercial and non-commercial vehicles are required to have functional brake lights in order to be legally operated on a public highway. Since brake lights are designed to be illuminated only when the brake pedal is engaged (e.g., depressed by a force, such as that provided by a driver's foot), and since the brake lights are generally located at the rear of the vehicle which is far away from the brake pedal, it is challenging for one person to depress the brake pedal and observe the brake lights at the same time.

One way to inspect the function of a vehicle's brake lights involves a first person to watch for illumination of the lights, and a second person to engage the brake pedal by foot. However, many times there is not a second person available when the operator of a bus or a tractor-trailer, or a person inspecting their daily delivery vehicle, needs to check the brake lights of the vehicle. A tractor-trailer operator may be alone at a rest stop, or on the side of the road with nobody around, or with only strangers around, when the brake lights must be checked. Even in professional repair shops, the need to have a second person to push on a brake pedal while a first person checks the function of the brake lights may be costly in terms of labor.

Current systems for engaging a vehicle brake pedal include devices which are designed to make frictional contact with a support structure near the brake pedal (e.g., the driver's seat or the steering wheel) and extend to the brake pedal in order to provide a compressive force against the brake pedal. Because of the lengthy distances between the brake pedal and the seat or steering wheel of a commercial vehicle (bus or semi-truck), existing devices tend to be large, bulky and lengthy. They tend to be difficult to install and remove, which takes up valuable operator time; and they can take up significant storage space which is often at a premium in both commercial and non-commercial vehicles. Inconsistencies in the position of the brake pedal relative to the positions of the seat and/or steering wheel can also affect the usability, reliability and/or functionality of existing devices. In addition, such devices often include large flanges, hooks, or other elements for engaging the seat and/or steering wheel, making such devices more difficult to use and store in the vehicle.

It is therefore desirable to provide reliable devices and methods for engaging the brake pedal of a vehicle to operate the rear brake lights that are simple, effective, easy to use and easy to store.

SUMMARY OF THE INVENTION

The present invention provides devices and methods for engaging the brake pedal of a vehicle using only the weight of the device, allowing a single person to check for proper functioning of the vehicle's brake lights without having to further attach the device to a seat or steering wheel of the vehicle. Embodiments of the devices may include an elongated shaft having a weight at one end, and a bracket, clamp or other structure at the opposite end for engagement with the brake pedal of a vehicle. In some embodiments, the engagement structure may comprise a latch with one or more widths, allowing the device to be securely attached to any of a number of different brake pedals having varying size and thickness. In some embodiments, the engagement structure may be stepped, allowing the same device to be attached to a relatively small and thin brake pedal of a compact commuter vehicle, or to a larger, thicker brake pedal of a commercial semi-truck. The devices of the present invention generally take advantage of leverage: the majority of the weight of the device is at the distal end of the device opposite from the brake pedal engagement structure. As a result, embodiments of the devices of the present invention are operable to engage a brake pedal requiring a relatively high amount of force to be depressed without adding extra weight to the device.

For shipping and storage purposes, it is preferable to provide embodiments of the invention that are small and relatively light weight. The effectiveness of such embodiments is arrived at through a combination of the length of the shaft and the amount of weight provided. Some embodiments of the invention may have a length of about fifteen inches (15") with a weight of between about five (5) and about eight (8) pounds. It is to be appreciated that depending on the angle of the device, a sufficient force may be delivered to the brake pedal using a shaft having a length of between about five and about twenty inches (5-20") with a weight of between about four (4) and about ten (10) pounds. By way of example, and without limitation, if the shaft is 15-inches long, and the angle of the shaft is thirty degrees (30°) a force of 2.5 pounds may be delivered using a five pound (5 lb.) weight; however, if the angle of the 15-inch shaft is changed to sixty degrees (60°) [which may require shortening the shaft in order to fit in the driver's compartment] then the same five pound (5 lb.) weight may provide 4.33 pounds of force. [$F(vert)=(weight) \times \sin \theta$]. Accordingly, alternative embodiments of the invention are contemplated that may be provided with steeper angles to provide more force from the same weight. The steeper angles of these embodiments may be accomplished by shortening the length of the shaft between the engagement end and the weighted end. For shipping purposes, embodiments with the lesser weights may be preferred, since shipping rates are primarily based on weight; however, for storage purposes, embodiment with shorter shafts may be preferred so that the device may fit more easily into a storage compartment of the vehicle. In some embodiments, both of these objectives may be accomplished by providing a variable length shaft.

It is to be appreciated that some brake pedals may be so resistant to engagement (either through design, or an aging brake system) that the normal weight of a device of the present invention is insufficient to engage the brake pedal. Alternative embodiments of the invention are provided to overcome such additional resistance. For example, and without limitation, embodiments of the invention may further comprise a supplemental weight that may be removably attached to the distal end of the device, adding weight to the device sufficient to overcome the increased resistance of the brake pedal. In another alternative embodiment, the shaft may be extendable (e.g., telescoping, etc.), making it possible to decrease the distance between the weight at one end of the shaft and the engagement structure at the opposite end, thereby increasing the leverage (downward force) of the device in regard to the brake pedal. In another alternative embodiment, the weight member may be removable such that it may be removed and replaced by a larger or smaller weight. In such embodiments, the distal end of the shaft and the weight member(s) may be provided with complementary attachment devices (e.g., a threaded male end and a threaded female end, a slot and a tab, and the like). Embodiments of the present invention may further be utilized as a tire billy (also known as a tire thumper), wherein a user holds the device by the lever, strikes the distal member against a tire of the vehicle, and listens for the sound made by the tire, in order to check for sufficient air pressure in the tire.

In one aspect, the present invention may provide a device for engaging a brake pedal of a vehicle, the device comprising an elongated arm or lever, an attachment member, and a weighted distal member, and methods of using the same. The lever may comprise a bar having a first end and a second end, the attachment member being located at the first end and the weighted distal member being located at the second end. In some embodiments, the bar may comprise a cylindrical shape having a substantially round cross-section, and a length. The length may provide a distance between the attachment member and the distal member, such that the leverage provided thereby is sufficient to engage the brake pedal while limiting the total weight of the device (e.g., in a range from about 3 inches to about 16 inches, from about 4 inches to about 12 inches, from about 5 inches to about 8 inches and all lengths or ranges of lengths in between). In other embodiments, the bar may comprise at least one of a T-shaped cross-section, an H-shaped cross-section, an ovular cross-section, a substantially square cross-section, a substantially triangular cross-section, and the like. In some embodiments, the lever may comprise a curve along its length, such that when the device is placed on the ground, at least a portion of the lever is raised off of the ground enough for a user's fingers to reach beneath the lever to pick it up (e.g., the lever having an upward curve when the device is installed on the brake pedal).

The elongated arm or lever may comprise a rigid material sufficient to support the distal member when the device is installed on the brake pedal. In some embodiments, the lever may comprise at least one of a metal, a metal alloy, carbon fiber, a plastic, a rubber, a wood, another natural or fabricated rigid material, and the like. In some embodiments, the lever may comprise an inner rigid portion and a resilient outer layer, the outer layer providing protection for the inner portion (e.g., from moisture) and providing comfort and grip for user's hand. In some embodiments, the outer layer may comprise at least one of a plastic, a rubber, leather, another natural or synthetic material, and the like.

The elongated arm or lever may comprise a grip, the grip allowing a user to securely hold the lever. In some embodiments, the grip may comprise an undulating shape, the undulating shape being complimentary to the shape of a user's fingers when holding the device. In some embodiments, the undulating shape may be located on a first side of the lever (e.g., the side facing downwardly when the device is installed on the brake pedal), and a shape complimentary to a user's palm (e.g., a gently rounded shape) may be located on a second side of the grip, the second side of the grip being opposite the first side of the grip.

In another embodiment, the grip may comprise a plurality of rings, each being shaped to allow at least a portion of a user's finger to pass therethrough. In some embodiments, the plurality of rings may comprise four adjacent rings arranged in series, allowing the user's four fingers to grip each of them simultaneously. In some embodiments, the lever may comprise the grip, comprising a plurality of rings, and may comprise an upward curve along its length.

In some embodiments, when the device is installed on the brake pedal, the first end may be proximal to the brake pedal and comprise the attachment member, and the second end may be distal to the brake pedal and comprise the weighted distal member. In some embodiments, the lever may be extendable, and thus operable to decrease the distance between the attachment member and the distal member, increasing the leverage of the device against the brake pedal. In some embodiments, the lever may be telescopically extended. In other embodiments, the lever may comprise a plurality of arms which may fold out to extend the length of the lever. In other embodiments, the lever may comprise a plurality of arms and joints which allow the lever to extend accordion-style. In some embodiments, the weight member may be slidable along the length of the arm, allowing it to change position relative to the pedal engagement member, thereby adding or removing weight depending on its position on the arm.

In some embodiments, the elongated arm or lever may comprise a first arm connected to the attachment member and a second arm connected to the distal member, the first arm being slidably engaged within the second arm (or vice versa). In some embodiments, said lever may comprise a locking device for reversibly locking the first arm and second arm in position relative to each other. In some embodiments, the locking device may comprise a spring-activated pin on the first arm operable to reversibly extend into one of a plurality of holes arranged in series along a length of the second arm. In another embodiment, the locking device may comprise an irregular outer circumferential surface on the second arm and an irregular inner circumferential surface on the first arm, wherein twisting the second arm in relation to the first arm causes the outer surface of the second arm to tighten against the inner surface of the first arm, preventing movement therebetween (e.g., the mechanism commonly used for locking telescoping arms of commercially available walking, hiking, and skiing poles). In other embodiments, the locking device may comprise a friction between the outer surface of the second arm and the inner surface of the first arm, each of such surfaces comprising a slightly tacky material (e.g., a plastic or a rubber). In yet other embodiments, the locking device may comprise a raised lip on an outer surface of the end of the first arm opposite from the attachment member, and a raised lip on an outer surface of the end of the second arm opposite from the distal member.

It is to be appreciated that the aspects of the elongated arm or lever, including its length, rigidity, telescopic aspect, shape, finger holes, etc. may be used individually or in combination, to provide improved grip, easier pickup from a surface, and proper angle relative to the brake pedal, in turn providing sufficient leverage and downward force to engage the brake pedal.

The attachment member may comprise any device operable to removably attach to the brake pedal of a vehicle. In some embodiments, a latch may be provided in the form of at least one of a rigid hook, clip or other latch, an elastic band, a tie down strap with a tightening device such as a buckle or cam, a strap with a hook and loop fastener (e.g., Velcro), similar securing devices, and a combination of such devices. In some embodiments, the attachment member may comprise at least one arm operable to fit over a portion of the brake pedal of the vehicle. In some embodiments, the arm may comprise a front member, a rear member, and a connecting member, the front member and the rear member being substantially parallel and operable to fit snugly against a front side and a rear side of the brake pedal, respectively, and the connecting member being substantially perpendicular to the front and rear members and operable to fit snugly against a top surface of the brake pedal. A distance between the front member and the rear member may be substantially similar to a common thickness of commercially available brake pedals. In some embodiments, the distance may be in a range from about ⅜ inch to about 1½ inches, from about ½ inch to about 1 inch, from about ⅝ inch to about ⅞ inch, and all distances and ranges of distances therebetween.

In some embodiments, the rear flange of the attachment member may comprise a stepped shape, the stepped shape providing sections of the attachment member with differing distances between the front and rear flanges, the differing distances allowing the attachment member to fit snugly over brake pedals of differing thicknesses. In some embodiments, the distance between the front flange and the stepped rear flange may comprise a first distance at upper ends of thereof, and a second distance at lower ends thereof. The first distance may be substantially similar to a common thickness of a brake pedal of a passenger vehicle such as a sedan, and the second distance may be substantially similar to a common thickness of a brake pedal of a commercial vehicle such as a bus or a semi-truck. In some embodiments the first distance may be in a range from about ⅜ inch to about ¾ inch, about ½ inch to about ⅝ inch, and every distance or range of distances therebetween, and the second distance may be in a range from about ¾ inch to about 1½ inch, from about ⅞ inch to about 1¼ inch, and every distance and range of distances therebetween.

In some embodiments, the front member of the attachment member may comprise a first arm and a second arm separated by a central divide, the first and second arms being operable to fit over the brake pedal on either side of the brake pedal's connecting lever, and the central divide being a passage for the connecting lever to traverse the front member. The first and second arms may thus prevent the attachment member from slipping off of the brake pedal in a lateral direction.

The attachment member may comprise a rigid material sufficient to support the weight of the lever and distal member when the device is installed on the brake pedal. In some embodiments, the attachment member may comprise at least one of a metal, a metal alloy, carbon fiber, a plastic, a rubber, a wood, another natural or fabricated rigid material, and the like. In some embodiments, the attachment member may comprise an inner rigid portion and a resilient outer layer, the outer layer providing protection for the inner portion (e.g., from moisture). In some embodiments, the outer resilient layer may comprise at least one of a plastic, a rubber, leather, another natural or synthetic material, and the like.

In some embodiments, the attachment member may be formed integrally with the elongated arm or lever (e.g., a single piece of forged metal). In other embodiments, the attachment member may be permanently attached to the elongated arm or lever (e.g., welded thereto). In yet another example, the attachment member may be removable from the elongated arm or lever and replaceable with a second attachment member having a different distance between the front member and the rear member, the proximal end of the lever and the attachment member(s) comprising complementary attachment devices (e.g., a threaded male end and a threaded female end, a slot and a tab, and the like).

In yet other embodiments, the connection between the attachment member and the proximal end of the elongated arm lever may be angularly adjustable (e.g., the angle between the plane of the front member and the central axis of the proximal end of the lever may be increased or decreased) via a lockable hinge. As such, when the device is installed on the brake pedal, the angle between the plane of the brake pedal and the central axis of the lever may be adjusted. The device may thus be adjusted to fit onto brake pedals which sit at varying angles from vertical, while maintaining an appropriate angle for the lever (e.g., in a range from about 45 degrees to about 135 from vertical) in order to maximize the leverage and downward force.

The weighted distal member may comprise a heavy mass or protuberance expanding from the second, or distal, end of the elongated arm or lever. The distal member may comprise at least one of a substantially cubic shape, a substantially spherical shape, substantially cylindrical shape (e.g., the substantially cylindrical shape having a central axis perpendicular to a central axis of the lever), a substantially pyramidal shape, a polyhedron shape, and the like. The distal member may comprise any dense material sufficient to provide a substantial weight to the distal end of the device. In some embodiments, the distal member may comprise a dense, rigid material. In some embodiments, the distal member may comprise at least one of a metal, a metal alloy, stone, wood, a plastic, a rubber, another dense natural or synthetic material, and the like. In some embodiments, the distal member may comprise a length of cylindrical stock steel or iron. In other embodiments, the distal member may comprise a length of square stock steel or iron cut such that all sides of the distal member comprise approximately the same dimensions (e.g., comprises a cubic shape). Use of stock metal may allow for easy and cheap manufacture in comparison to utilizing a mold, and the cubic shape may provide the benefit of preventing the device from rolling sloped ground or rolling around inside the vehicle as it turns.

In some embodiments, the distal weighted member may comprise an inner rigid portion and a resilient outer layer, the outer layer providing protection for the inner portion (e.g., from moisture) and providing comfort and grip for user's hand. In some embodiments, the outer layer may comprise at least one of a plastic, a rubber, leather, another natural or synthetic material, and the like. In some embodiments, the lever may be formed integrally with the distal member (e.g., a single piece of forged steel). In other embodiments, the distal member may be removably attached to the lever, as described herein.

The distal weighted member may comprise a weight sufficient to provide enough force to engage the brake pedal when installed thereon, considering the length of the lever. The longer the lever, the less weight will be necessary in the distal member for such purpose, and the heavier the distal member, the less length is will be necessary in the lever. The device may comprise a lever long enough to keep the weight of the distal member low (and thus the overall weight of the device low enough that it will not be cumbersome for the user), while still providing enough downward force to engage the brake pedal. In some embodiments, the distal member may comprise a weight in a range from about 1 pound to about 10 pounds, or in a range from about 2 pounds to about 8 pounds, or from about 3 pounds to about 6 pounds, or any weight or range of weights in between. In some embodiments, the distal member may comprise a weight of about 4 pounds.

In some embodiments, a plurality of removable and replaceable distal weighted members of differing shape and/or differing weight may be provided (e.g., a first distal member comprising a cubic shape and a weight of about 4 pounds, and a second distal member comprising a cylindrical shape and a weight of about 6 pounds), each with an attachment device for attaching to the second end of the elongated arm or lever. The attachment device on a replaceable distal member may comprise at least one of: a male threaded end complementary to a female threaded end on the second end of the lever; a female threaded end complementary to a male threaded end of the second end of the lever; a tab complementary to a slot on the second end of the lever (e.g., a tongue and groove connection); a slot complementary to a tab on the second end of the lever; a male end with a protrusion at an end thereof complementary to a slot on the second end of the lever, the slot having a variable diameter collar (e.g., a plurality of circumferentially arranged ball bearings inside a slidable locking collar); and another attachment device suitable for removably connecting mechanical parts.

The device may further comprise a supplemental weight, the supplemental weight being operable to connect to the distal end of the lever, adding weight to the distal end and adding downward force against the brake pedal. The supplemental weight may comprise a weighted portion and a securing member (e.g., a hook or clip) which is operable to attach to the distal end of the lever, adding weight to the device sufficient to engage a brake pedal having increased resistance. The weighted portion may comprise a shape that is complementary to a shape of the distal member, such that the supplemental weight may rest against or upon the distal member in a balanced manner (e.g., an L-shape for laying over the top and distal side of a cubic-shaped distal member, or a C-shape for laying over the top of a cylindrical or spherical distal member).

A method of using the present invention may comprise the steps of installing the device on a brake pedal of a vehicle by engaging it with the brake pedal (or latching the attachment member onto the brake pedal if a latch is provided) to cause force to be exerted on the brake pedal. This force should be sufficient to operate the brake lights at the rear of the vehicle, allowing the user to check them for the proper functioning. In some embodiments, the method may further comprise the step of removing a first distal member from the lever, and replacing it with a second distal member having a greater mass than the first distal member. In some embodiments, the method may further comprise the step of adjusting an angle between the lever and the attachment device. In another embodiment, the method may further comprise the step of attaching a supplemental weight to the device. In yet another embodiment, the method may further comprise the step of striking the distal member against a tire of the vehicle and listening for the sound made by the tire.

In one aspect, the invention relates to a device for engaging a brake pedal of a vehicle, the device comprising: an attachment member for attaching to the brake pedal; a distal member for adding mass to the device; and a lever for providing a distance between the attachment member and the distal member. In another implementation, the attachment member is positioned at a first end of the lever, and the distal member is positioned at a second end of the lever. In another implementation, the attachment member comprises a front member and a rear member, the rear member comprising a stepped shape wherein the front member and the rear member are separated by a first distance at an upper end thereof, and separated by a second distance at a lower end thereof. In another implementation, the second distance is greater than the first distance. In another implementation, the first distance is in a range from about ⅜ inch to about ¾ inch, and the second distance is in a range from about ¾ inch to about 1½ inches. In another implementation, the attachment member comprises a front member and a rear member, the rear member comprising a first arm and a second arm separated by a central divide. In another implementation, the lever comprises a grip. In another implementation, the lever is extendable, and is operable to increase the distance between the attachment member and the distal member. In another implementation, the lever is telescopic, comprising a first arm attached to the attachment member and a second arm attached to the distal member, the first arm being slidably engaged with the second arm. In another implementation, the lever further comprises a locking device. In another implementation, the lever is angularly adjustable. In another implementation, the distal member comprises a weight in a range from about 1 pound to about 10 pounds. In another implementation, the distal member comprises at least one of a substantially cubic shape, a substantially spherical shape, and a substantially cylindrical shape. In another implementation, the distal member is removable and replaceable. In another implementation, the device comprises a first distal member having a first mass and a second distal member having a second mass, each of the first distal member and the second distal member comprising a first attachment device having a shape complementary to a shape of a second attachment device on the second end of the lever. In another implementation, the device further comprises a supplemental weight.

In another aspect, the present invention relates to a method of checking for proper functioning of the brake lights of a vehicle, comprising the steps of: installing a device comprising an attachment member, a lever, and a distal member, on a brake pedal of the vehicle by connecting the attachment member to the brake pedal; and checking for illumination of the brake lights. In another implementation, the distal member is removeable and replaceable, and the method further comprises the step of: removing the distal member from the lever and replacing the distal member with a second distal member having a greater mass than the distal member. In another implementation, the lever is angularly adjustable, and the method further comprises the step of: adjusting an angle between a central axis of the lever and the attachment member. In another implementation, the lever is extendable, and the method further comprises the step of: adjusting a length of the lever.

Further aspects and embodiments will be apparent to those having skill in the art from the description and disclosure provided herein.

It is therefore an object of the present invention to provide methods and apparatus for engaging a brake pedal of a vehicle to operate the vehicle brake lights using only the weight of the device.

It is a further object of the present invention to provide methods and apparatus for checking the proper function of the brake lights of a vehicle without the need for two people.

It is a further object of the present invention to provide methods and apparatus for engaging a brake pedal of a vehicle to operate the vehicle brake lights without frictional engagement with another surface in the vehicle such as the driver's seat or the steering wheel.

It is a further object of the present invention to provide methods and apparatus for engaging a brake pedal of a vehicle to operate the vehicle brake lights which are operable to fit snugly over brake pedals of varying sizes, shapes, thicknesses and dimensions.

It is a further object of the present invention to provide methods and apparatus for engaging a brake pedal of a vehicle to operate the vehicle brake lights which are operable to engage brake pedals of varying resistance.

It is a further object of the present invention to provide methods and apparatus for engaging a brake pedal of a vehicle to operate the vehicle brake lights which are adaptable to increase the weight of the device when needed for overcoming a high-resistance brake pedal.

It is a further object of the present invention to take advantage of leverage in overcoming the resistance of a brake pedal.

It is a further object of the present invention to provide methods and apparatus for engaging a brake pedal of a vehicle to operate the vehicle brake lights which are adaptable to maintain leverage against brake pedals which sit at various angles.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 2B shows a side view of the embodiment of FIG. 1.

FIG. 2E shows an opposite end view of the embodiment of FIG. 1.

FIG. 2G shows a bottom view of the embodiment of FIG. 1.

FIG. 3 shows a side view of an alternative embodiment of the present invention.

DETAILED DESCRIPTION

Figure 1:
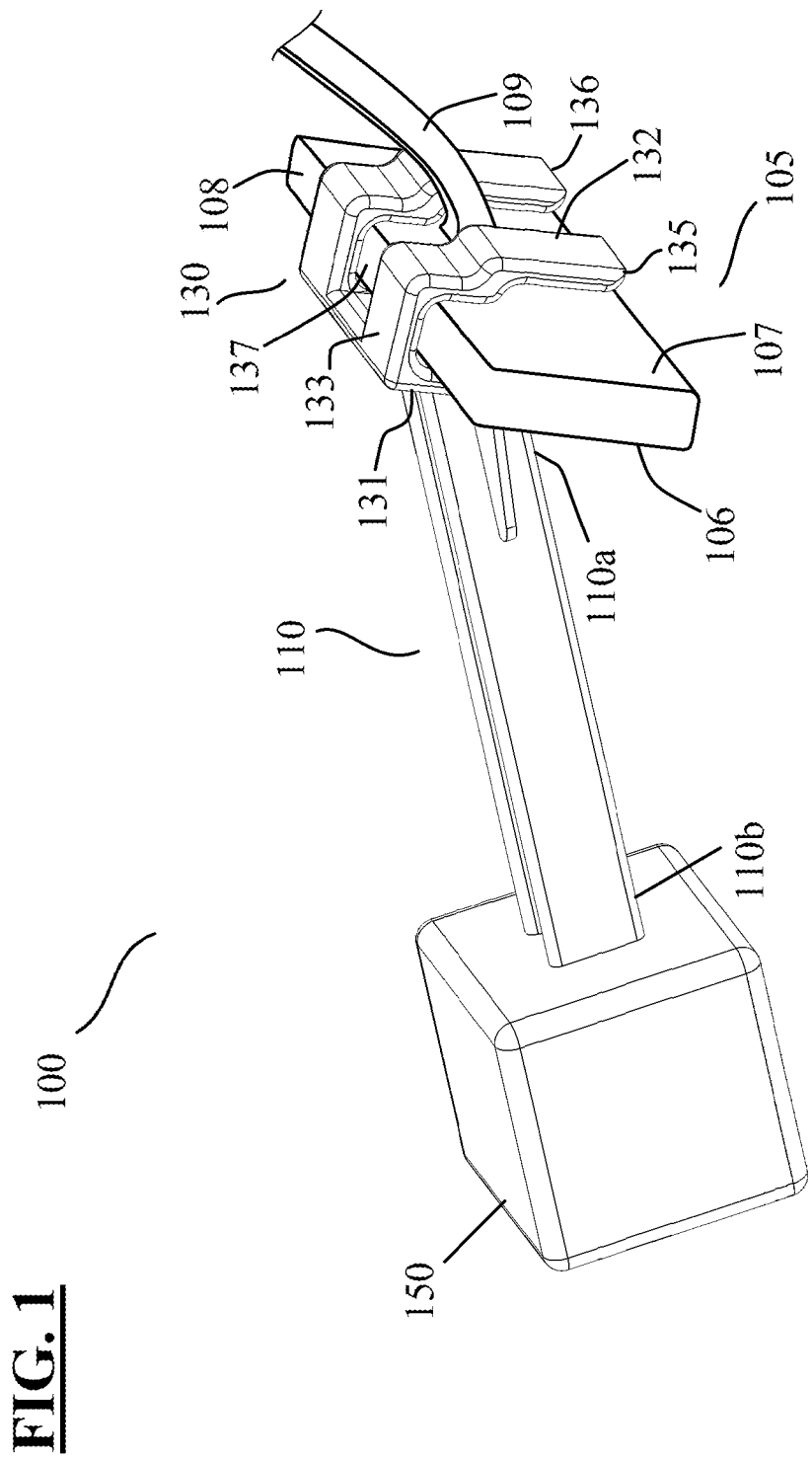
FIG. 1 shows a perspective view of an embodiment of a brake pedal weight device of the present invention installed on a brake pedal of a vehicle.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the description and claims. In the following disclosure, specific details are given to provide a thorough understanding of the invention. However, it will be apparent to one skilled in the art that the present invention may be practiced without all of the specific details provided.

Embodiments of the present invention may provide a device 100 for engaging a brake pedal 105 of a vehicle, the device comprising an arm or lever 110, an attachment member 130 located at one end of the arm for engaging a brake pedal 105, and a weighted member 150 located at the opposite end of the arm, and methods of using the same. In some embodiments, the arm 110 may comprise a bar having a first or proximal end 110a and a second or distal end 110b, where the attachment member 130 is located at the first end 110a and the weighted member 150 is located at the second end 110b.

As seen in the exemplary embodiment of FIG. 1, arm 110 may comprise a substantially straight shaft. Although the illustrated embodiment shows the arm having a substantially H-shaped cross-section, the cross-section may be provided in other shapes that are sturdy enough to transmit the weight 150 at the second end 110b to the attachment member 130 and brake pedal 105 at the first end 110a (such as, without limitation, a hollow shaft, I-beam, etc.). Bar 110 may comprise a rigid material sufficient to support the distal member 150 when the device 100 is installed on the brake pedal 105, the first end 110a being proximal to the brake pedal 105 and comprising the attachment member 130, and the second end 110b being distal to the brake pedal 105 and comprising the weighted member 150.

Figure 4:
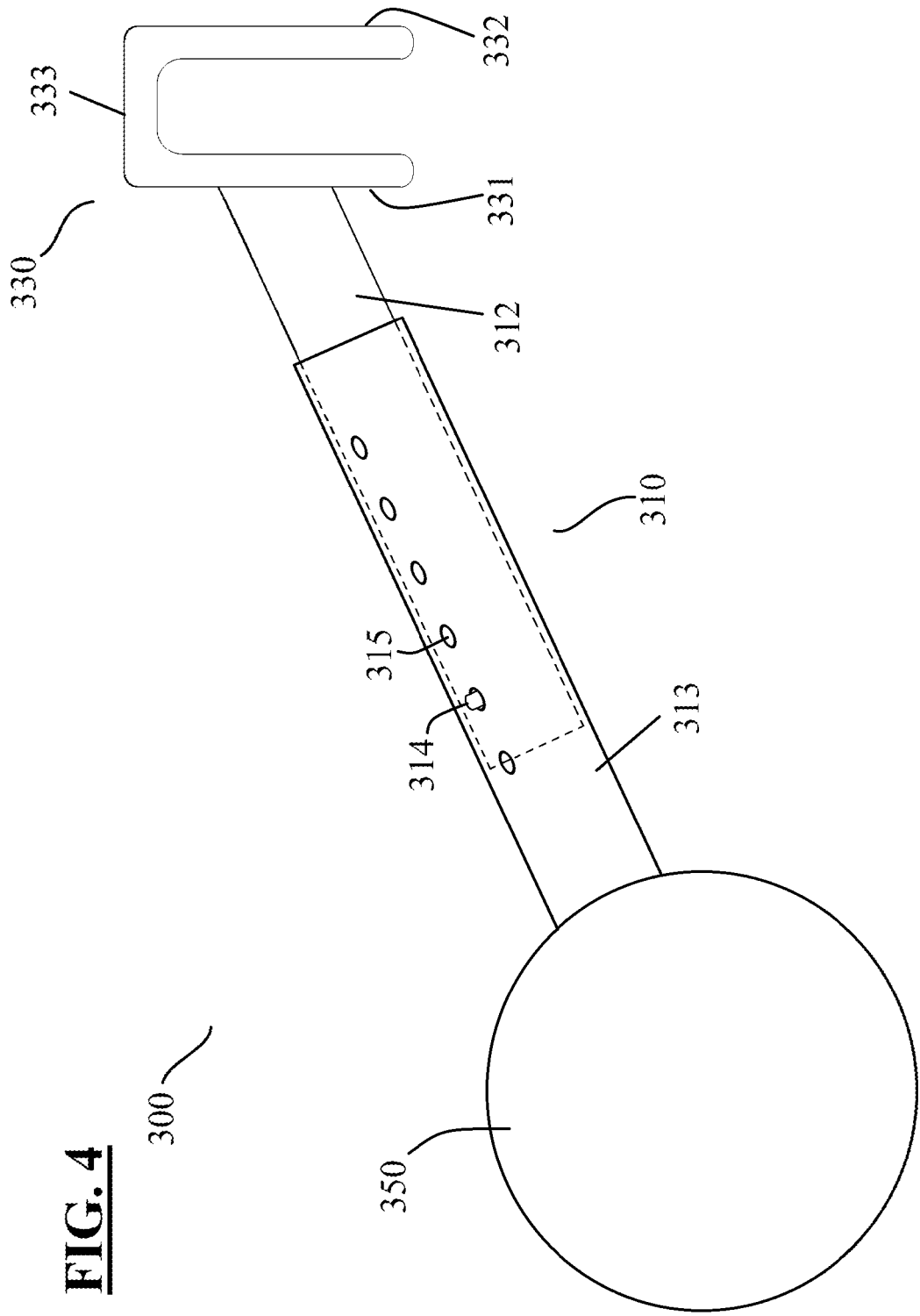
FIG. 4 shows a side view of another alternative embodiment of the present invention.

In some embodiments, the attachment member 130 may have a simple structure, such as those shown in FIGS. 3 and 4. In these embodiments, the attachment member 130 may comprise a bracket made from a rigid material sufficient to support the weight of the arm 110 and the weighted member 150 when the device 100 is engaged with a brake pedal 105, the attachment member 130 being operable to removably engage the brake pedal 105 of the vehicle. The attachment member 130 may be formed integrally with arm 110, or it may be removable from arm 110 so that it may be replaced with a different attachment member having a different size or shape, allowing different embodiments of the invention to be used with brake pedals having different sizes or shapes. In embodiments of the invention, the attachment member may comprise a front member 131 (or 231, 331), a rear member 132 (or 232, 332), and a connecting member 133 (or 233, 333). A plane of the front member 131 and a plane of the rear member 132 may be substantially parallel so as to fit snugly against a front side 106 and a rear side 107 of the brake pedal 105, respectively. The connecting member 133 in these embodiments may be substantially perpendicular to the planes of the front 131 and rear 132 members and may be engaged so as to fit snugly against a top surface 108 of the brake pedal 105. An opening 137 may be provided in rear member 132 to receive a shaft 109 attached to brake pedal 105. In some embodiments, opening 137 may extend to top member 133.

Figure 2A:
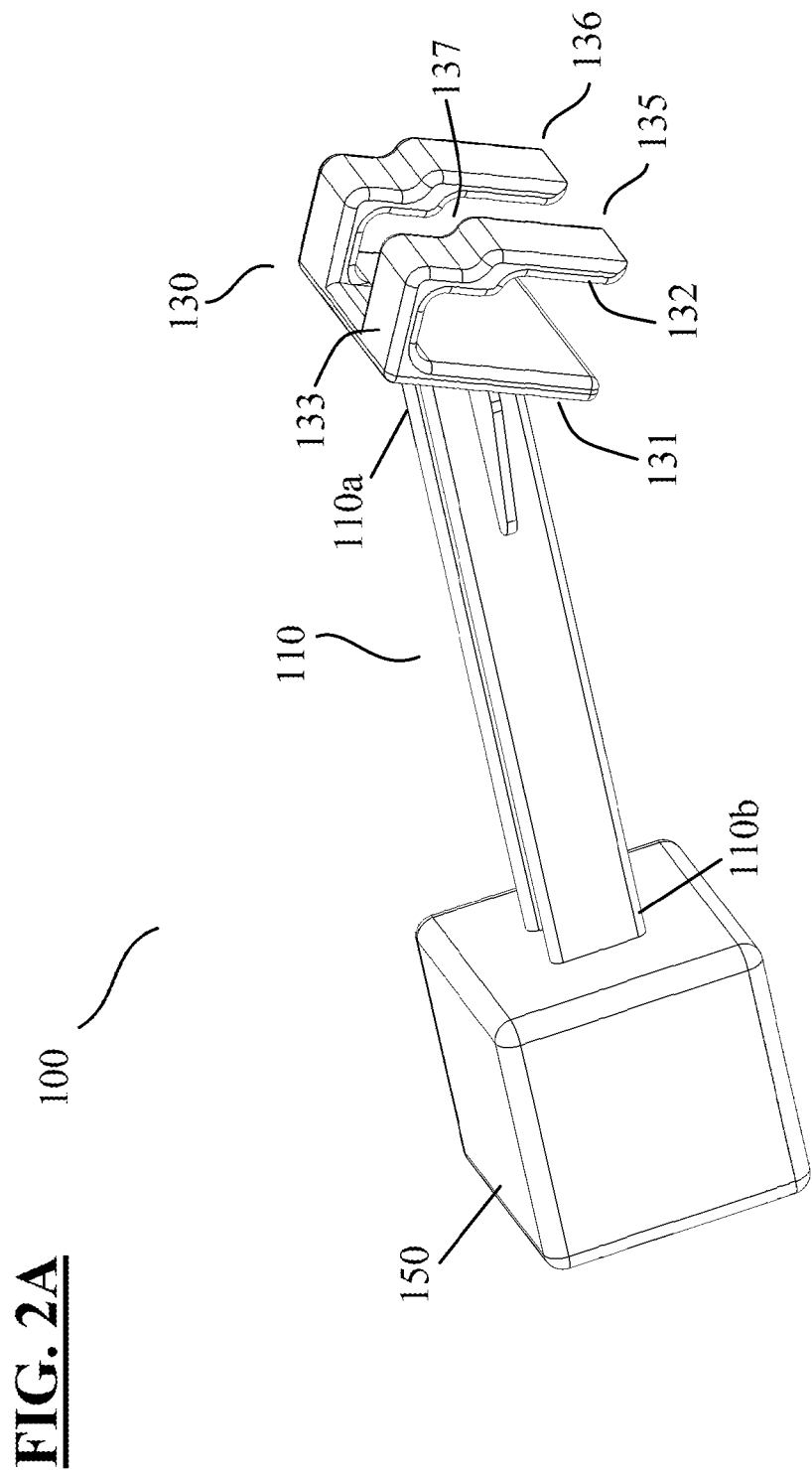
FIG. 2A shows a perspective view of the embodiment of FIG. 1.
Figure 2C:
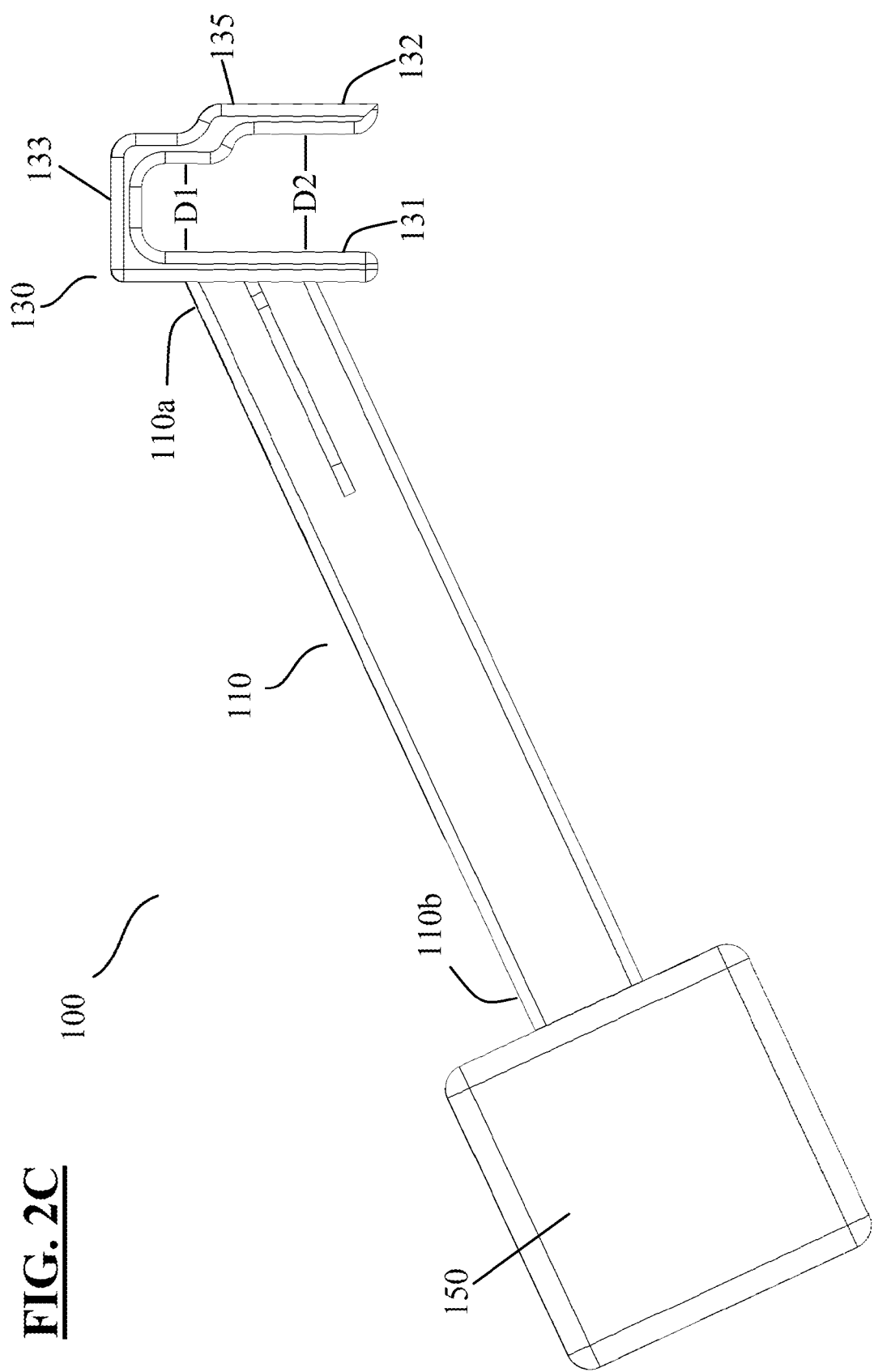
FIG. 2C shows an opposite side view of the embodiment of FIG. 1.
Figure 2D:
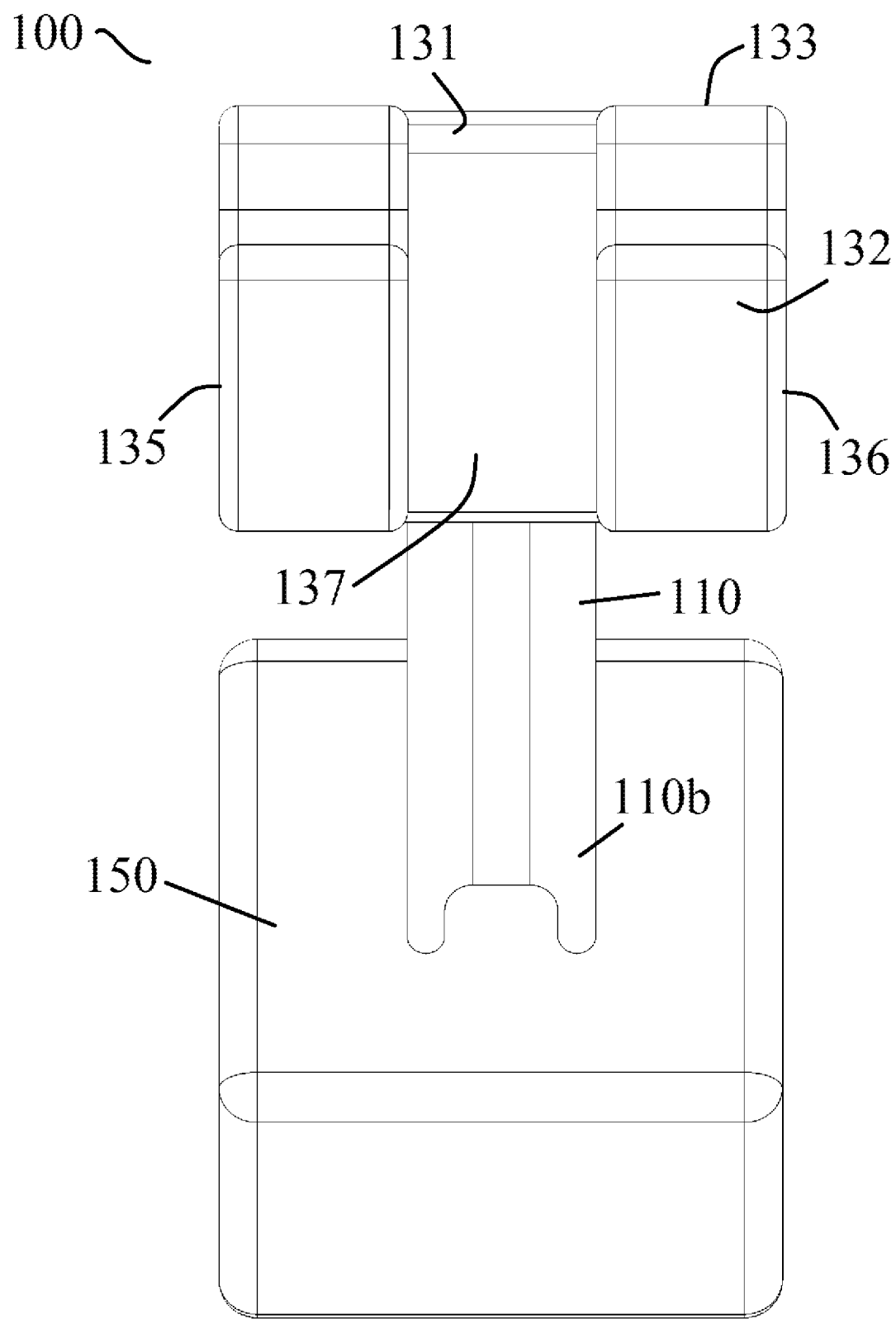
FIG. 2D shows an end view of the embodiment of FIG. 1.
Figure 2F:
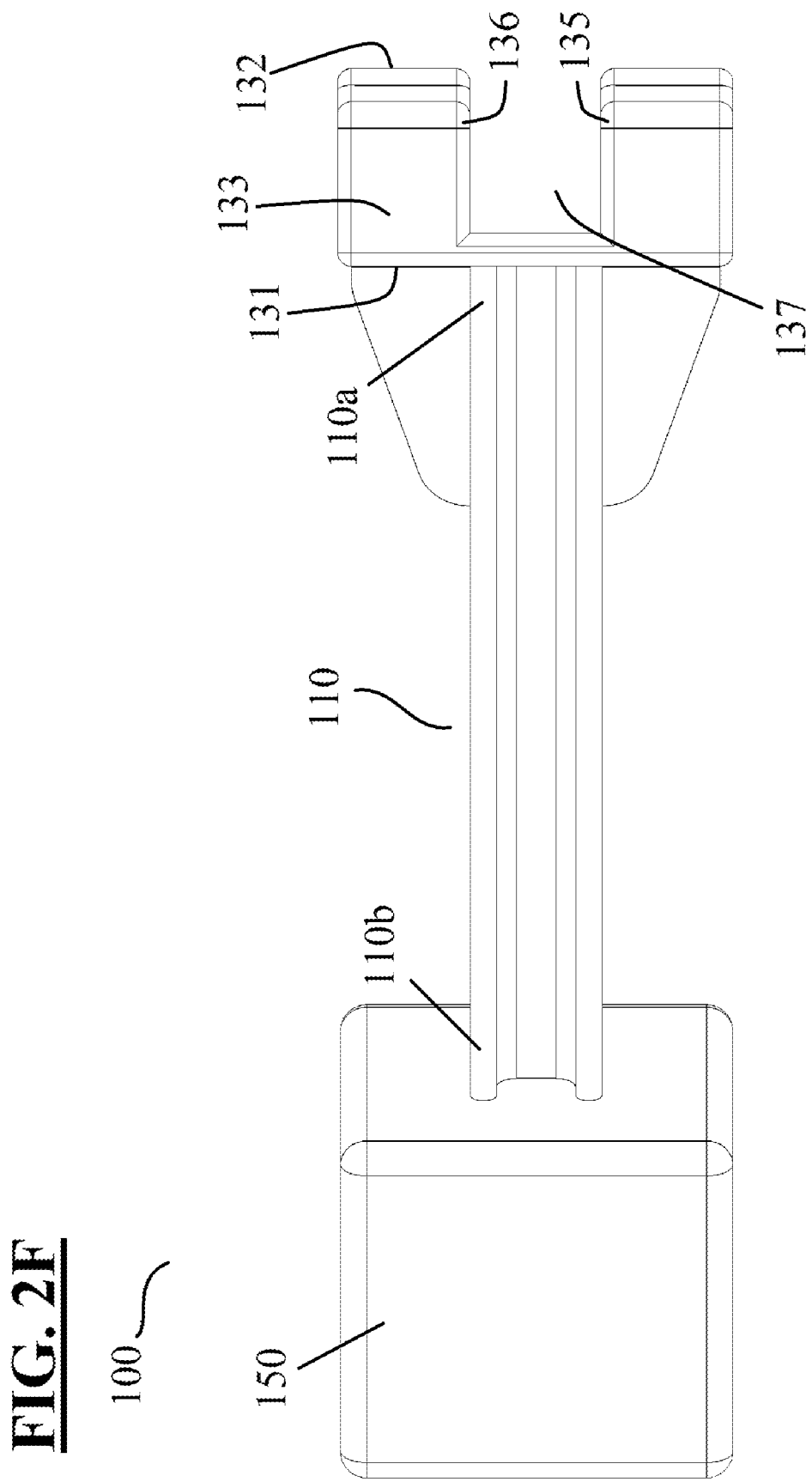
FIG. 2F shows a top view of the embodiment of FIG. 1.

In some embodiments, rear member 132 may comprise a stepped shape, as shown in FIGS. 1-2G. When provided, such a stepped shape creates sections of the attachment member 130 defining a first (smaller) distance D1 between the front 131 and rear 132 members at upper ends thereof, and a second (larger) distance D2 between the front 131 and rear 132 members at lower ends thereof. See, e.g., FIGS. 2B and 2C. The first distance D1 and the second distance D2 allow the same attachment member 130 to be used to fit snugly over brake pedals of differing thicknesses (e.g., the first distance D1 corresponding to a smaller thickness of a brake pedal of a passenger vehicle, and the second distance D2 corresponding to a larger thickness of a brake pedal of a commercial vehicle).

The rear member 131 may comprise a first arm 135 and a second arm 136 separated by a central divide 137, the first 135 and second 136 arms being operable to fit over the brake pedal 105 on either side of the brake pedal's connecting lever 109, and the central divide 137 being operable to function as a passage through which the connecting lever 109 may traverse the rear member 131. The first 135 and second 136 arms may thus prevent the attachment member 130 from slipping off of the brake pedal 105 in a lateral direction.

Figure 5:
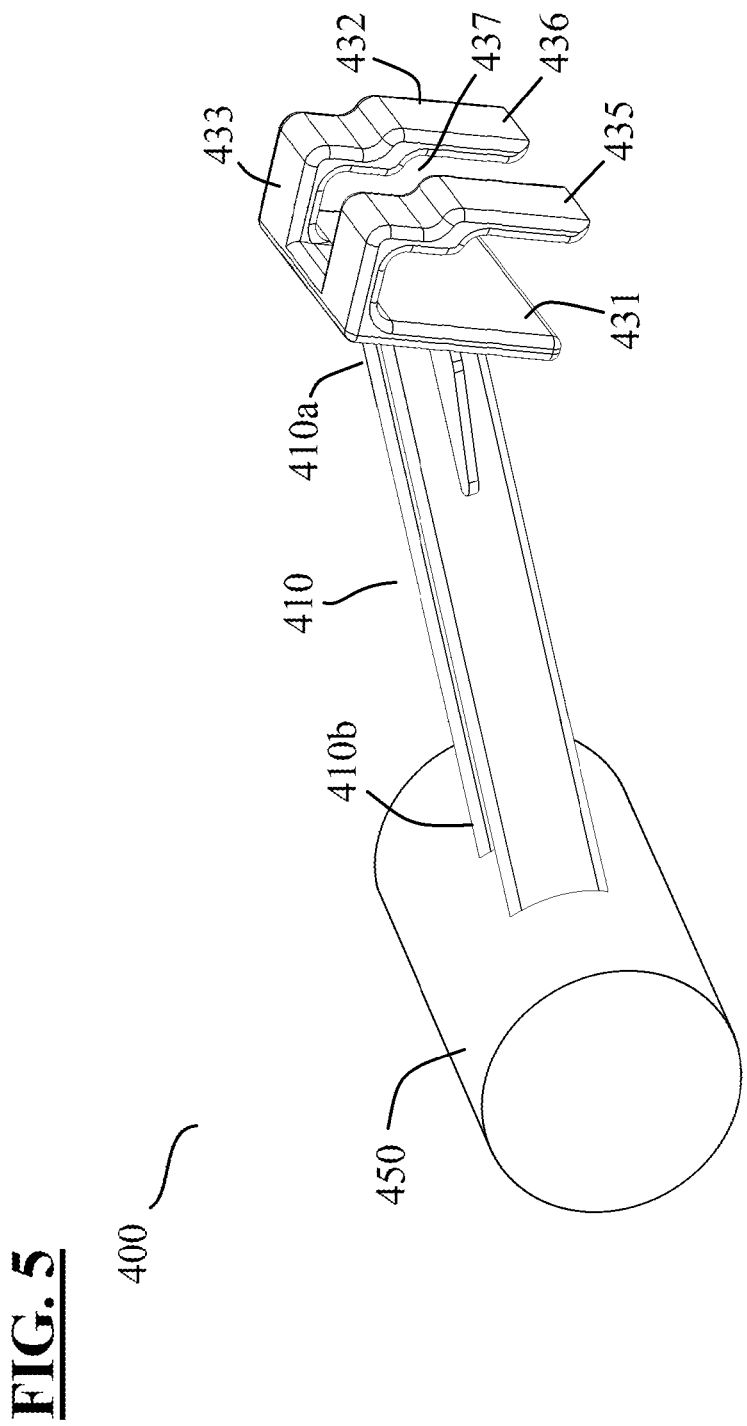
FIG. 5 shows a perspective view of another alternative embodiment of the present invention.
Figure 6:
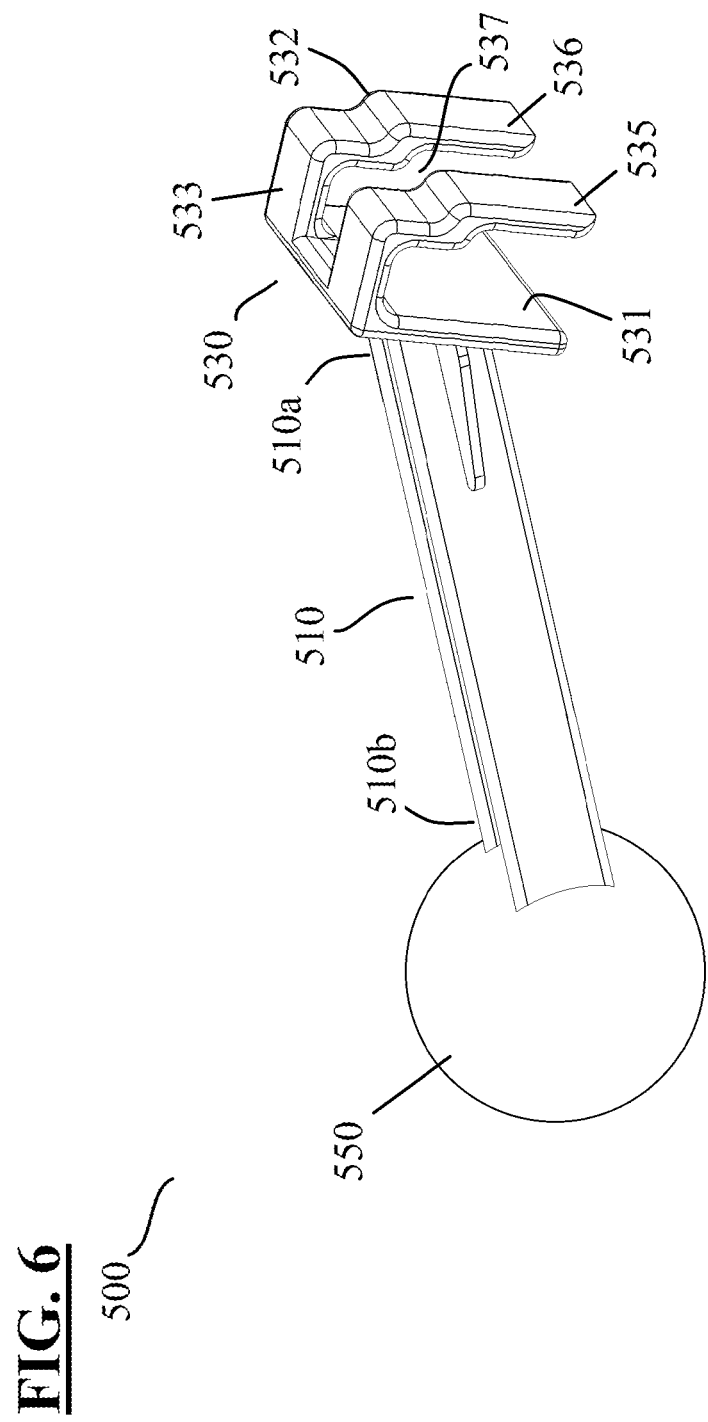
FIG. 6 shows a perspective view of another alternative embodiment of the present invention.

The weighted distal member 150 may comprise a heavy mass which may be integral with arm 110, or removable from the second end 110b of the arm 110. Although mass 150 is illustrated having a generally cubic shape in some of the drawings, and a drum shape in other drawings, and a spherical shape in other drawings, it may be provided in any suitable shape so as to fit in the driver compartment of a vehicle underneath the steering wheel and in front of the driver's seat. The weighted member 150 may comprise any dense material (e.g., lead) and may comprise a weight sufficient to provide enough force to depress the brake pedal 105 when engaged therewith. In some embodiments, arm 110 may be formed integrally with the distal member 150 (e.g., a single piece of forged metal), or it may be removable and replaceable with a different weighted member. In some embodiments, the distal member may comprise at least one of a substantially cylindrical shape 450 (e.g., the substantially cylindrical shape having a central axis perpendicular to a central axis of the lever; see FIG. 5) and a substantially spherical shape 550 (see, e.g., FIG. 6).

Referring to the embodiment of FIG. 3, it is seen that arm 210 may comprise a curve along its length from the first end 210a to the second end 210b, such that when the device 200 is placed on the ground, at least a portion of the lever 210 is raised off of the ground enough for a user's fingers to reach beneath the lever 210 to pick it up. The lever 210 may further comprise an optional grip 211, the grip 211 allowing a user to securely hold the lever 210. The grip 211 may comprise a plurality of adjacent rings arranged in series, each being shaped to allow at least a portion of a user's finger to pass therethrough. The attachment member 230 may comprise a single distance D between the front member 231 and the rear member 232, each of which may be substantially planar. In alternative embodiments, the grip may be omitted from the curved arm 210. In other embodiments, attachment member 230 may have a stepped shape defining two distances D1 and D2 for engagement with brake pedals of different sizes.

In some embodiments, the length of arm 110 may be adjustable. In the embodiment of FIG. 4, arm member 310 is shown as telescopic, allowing the distance between the attachment member 330 and the weighted distal member 350 to be lengthened or shortened. In these embodiments, member 310 may comprise a first arm 312 connected to the attachment member 330 and a second arm 313 connected to the distal member 350, with the first arm 312 being slidably engaged within the second arm 313 (or vice versa). These embodiments may further comprise a locking device 314 for locking the first arm 312 and second arm 313 in position relative to each other. The locking device 314 may comprise a spring-activated pin on the first arm 312 operable to reversibly extend into one of a plurality of holes 315 arranged in series along a length of the second arm 313. It is to be appreciated that in alternative embodiments, the second arm 313 may be slidably engaged within the first arm 312. It is also to be appreciated that the weighted member 350 and engagement member 330 may be detachable from their respective arms 313 and 312. Finally, it is to be appreciated that attachment member 330 may have a stepped shape defining two distances D1 and D2 for engagement with brake pedals of different sizes.

Figure 7:
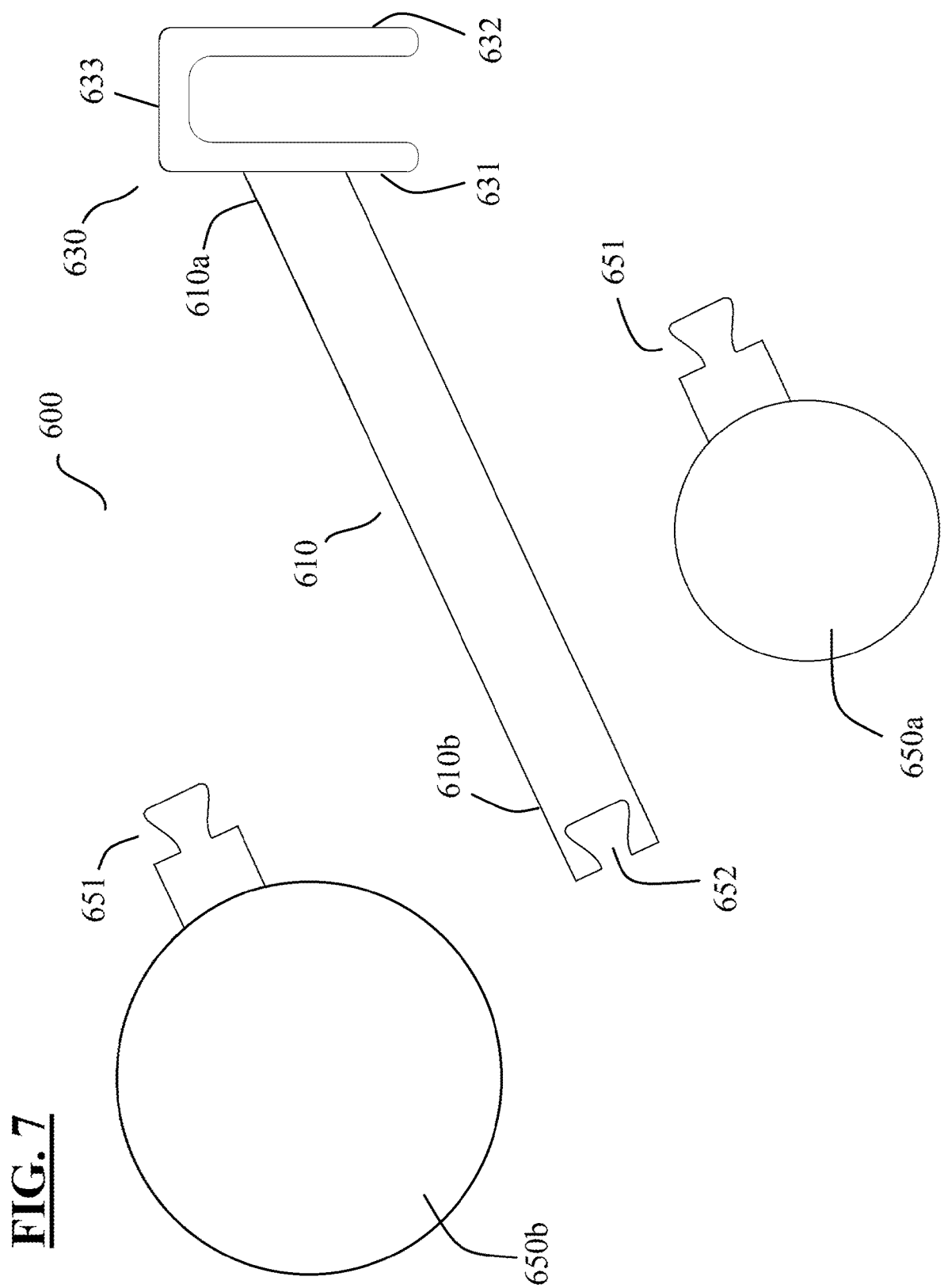
FIG. 7 is an exploded view of another alternative embodiment of the present invention.

Referring to the embodiment shown in FIG. 7, it is seen that a plurality of removable and replaceable distal weighted members may be provided, each having an attachment device 651 complementary in shape to an attachment device 652 on the second end 610b of the lever arm 610. The plurality of distal members may comprise a first distal member 650a having a first mass, and a second distal member 650b having a second mass. The second mass may be substantially greater than the first mass, such that if the device 600 including the first distal member 650a is unable to provide enough downward force to depress the brake pedal and activate the lights of the vehicle, a user may remove the first distal member 650a from the lever arm 610 and replace it with the second heavier distal member 650b. The attachment devices 651, 652 may comprise any suitable arrangement, and are not limited to the tongue and groove connection shown in FIG. 7, wherein the attachment devices 651 on the distal members 650a, 650b each comprise a tab which is complementary to a slot of attachment device 652 on the lever 610. As with other embodiments, it is to be appreciated that attachment member 630 may have a stepped shape defining two distances D1 and D2 for engagement with brake pedals of different sizes.

Figure 8:
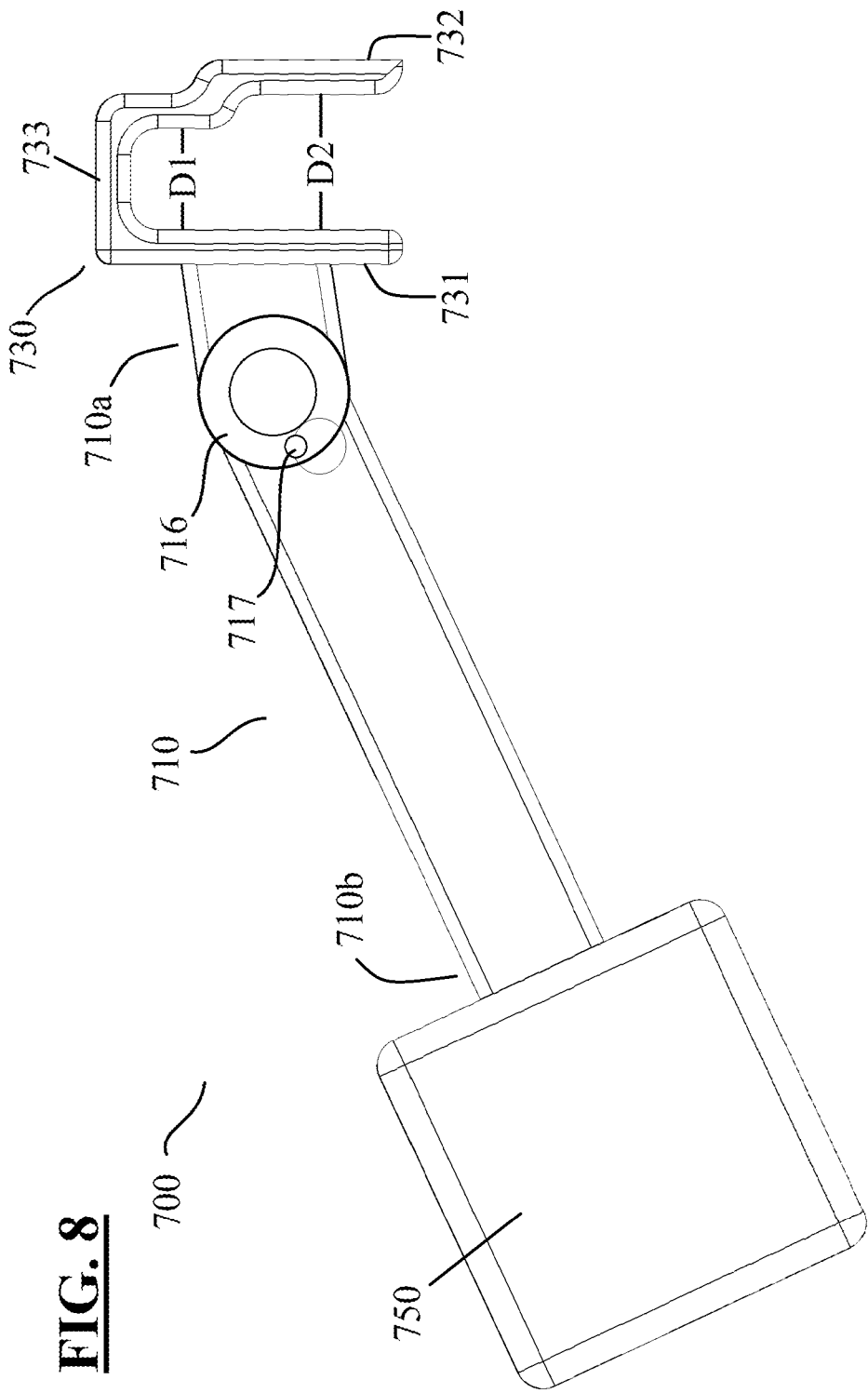
FIG. 8 shows a side view of another alternative embodiment of the present invention.

As seen in the embodiment of FIG. 8, a first end 710a of the lever arm 710 may include an adjustable pivot or hinge 716. Pivot 716 allows the angle between the plane of the front member 713 and a central axis of the second end 710b of the lever arm 710 to be increased or decreased around pivot 716, and then locked in place using a locking structure, such as pin 717. As such, when the device 700 is installed on the brake pedal 105 (see FIG. 1), the angle between the plane of the brake pedal 105 and the central axis of the second end 710b of the lever arm 710 may be adjusted. The device 700 may thus be adjusted to fit onto brake pedals which sit at varying angles from vertical, while maintaining an appropriate angle for the lever arm 710 in order to maximize the leverage and downward force of the device 710 on the brake pedal 105. As with other embodiments, it is to be appreciated that attachment member 730 may or may not have a stepped shape defining two distances D1 and D2 for engagement with brake pedals of different sizes.

In use, an attachment member 130 of an embodiment of a device of the present invention is engaged over a brake pedal 105 of a vehicle such that the support arm 109 extends through opening 137. The user then releases the device allowing it to rest on the floor of the driver's compartment of the vehicle below the steering wheel and in front of the driver's seat. The mass of weight 150 is transmitted through arm 110 and pulls attachment member 130 down, thereby depressing the brake pedal in order to activate the rear brake lights. The user may then walk to the back of the vehicle to check to make sure all lights are properly functioning. When not in use, the convenient size and shape of the device allows it to be easily removed and stored in any small storage area. If additional downward force is needed, in embodiments of the invention, the existing weight 150 may be removed and replaced with a heavier weight; in alternative embodiments, the distance between the attachment member 130 and the weight 150 may be changed in order to increase or decrease the amount of force applied to the brake pedal.

The present brake pedal weight device and methods of the present invention are capable of engaging the brake pedal of a vehicle using only the weight of the device, allowing a single person to check for proper functioning of the vehicle's brake lights without having to further attach the device to a seat or steering wheel of the vehicle. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A device for engaging a brake pedal of a vehicle comprising:
   a. a one-piece first arm member having a fixed length;
   b. an attachment member located at one end of said first arm member for engagement with said brake pedal, said attachment member comprising a pair of identical second arms mounted in parallel to each other with an opening between the second arms for receiving a support arm of said brake pedal; and
   c. a weighted member at an opposite end of said first arm for applying downward force on said first arm without engaging another surface.

2. The device of claim 1 wherein said attachment member is provided in the form of an open ended bracket that may be fitted over said brake pedal.

3. The device of claim 1 wherein each second arm comprises a front member and a rear member, said rear member comprising a stepped shape wherein said front member and said rear member are separated by a first distance at an upper end thereof, and separated by a second distance at a lower end thereof.

4. The device of claim 3 wherein said second distance is greater than said first distance.

5. The device of claim 4 wherein said first distance is in a range from about ⅜ inch to about ¾ inch in order to snugly engage the brake pedal having a first size, and said second distance is in a range from about ¾ inch to about 1½ inches in order to snugly engage the brake pedal having a second size.

6. The device of claim 1 wherein said first arm member is provided in a curved shape.

7. The device of claim 1 wherein said first arm member further comprises a grip.

8. The device of claim 1 wherein said weighted member comprises a weight in a range of between about 1 pound and about 10 pounds.

9. The device of claim 1 wherein said weighted member has a shape that is selected from the group of: a substantially cubic shape, a substantially spherical shape, a substantially cylindrical shape, and combinations thereof.

10. The device of claim 1 wherein said attachment member is removable and replaceable.

11. The device of claim 1 wherein said weighted member is removable and replaceable.

12. The device of claim 1, further comprising a supplemental weight.

13. A device for engaging a brake pedal of a vehicle comprising:
   a. a one-piece arm member having a fixed length;
   b. an attachment member located at one end of said arm member for engagement with said brake pedal, said attachment member comprising a pair of flanges having an opening between the flanges for receiving a support arm of said brake pedal; and
   c. a weighted member at an opposite end of said arm for applying downward force on said arm without engaging another surface,
   wherein said arm member includes a pivot located thereon for adjusting the angle between said attachment member and said weighted member.

14. The device of claim 13 further comprising a device for locking said pivot in place.

15. A method of checking for proper functioning of brake lights of a vehicle, comprising the steps of:
   a. engaging a vehicle brake pedal with a device comprising a one-piece arm having a fixed length, a brake pedal engagement member at one end of said arm, and a weighted member at an opposite end of said arm, by attaching said engagement member with said brake pedal such that said weighted member exerts downward force on said brake pedal; and
   b. checking for illumination of said brake lights.

16. The method of claim 15 wherein said weighted member is removable and replaceable, and comprising the additional step of removing said weighted member from said arm and replacing it with a second weighted member having a different mass than said first member.

17. The method of claim 15 wherein said arm further comprises a pivot, and comprising the additional step of adjusting an angle between a central axis of said arm and said engagement member.

18. A device for engaging a brake pedal of a vehicle comprising:
   a. an elongated curved arm member;
   b. an attachment member located at one end of said elongated curved arm member for engagement with said brake pedal, said attachment member comprising a pair of identical arms mounted in parallel to each other with an opening between said arms for receiving a support arm of said brake pedal; and
   c. a weighted member at an opposite end of said elongated curved arm.

* * * * *